United States Patent [19]
Eom

[11] Patent Number: 5,679,083
[45] Date of Patent: Oct. 21, 1997

[54] WHEEL DRIVING DEVICE FOR LOADER

[75] Inventor: Seong Sup Eom, Seoul, Rep. of Korea

[73] Assignee: Jung Il Industrial Co., Ltd., Kyunggi-do, Rep. of Korea

[21] Appl. No.: 607,308

[22] Filed: Feb. 26, 1996

[30]  Foreign Application Priority Data

Jan. 17, 1996 [KR] Rep. of Korea ............ UM96-576 U

[51] Int. Cl.⁶ ..................................... F16H 9/00
[52] U.S. Cl. ................................ 474/5; 414/579
[58] Field of Search .................. 474/1, 4, 5; 414/579

[56]  References Cited

U.S. PATENT DOCUMENTS

| | | | |
|---|---|---|---|
| 2,924,993 | 2/1960 | White | 474/5 |
| 2,930,246 | 3/1960 | Johnson et al. | 474/5 |
| 3,108,481 | 10/1963 | Westmont | 474/5 |
| 3,477,439 | 11/1969 | Hamouz et al. | 474/5 X |
| 3,722,277 | 3/1973 | Fell et al. | 474/5 |
| 3,796,275 | 3/1974 | Bouyer | 474/5 X |
| 3,925,970 | 12/1975 | Rusco | 474/5 X |
| 3,938,400 | 2/1976 | Konya | 474/5 |
| 4,634,403 | 1/1987 | Peabody et al. | 474/4 X |
| 4,696,661 | 9/1987 | Rehlander | 474/5 |
| 5,393,270 | 2/1995 | Grobbelaar | 474/5 |

*Primary Examiner*—Roger J. Schoeppel
*Attorney, Agent, or Firm*—Ladas & Parry

[57]  ABSTRACT

A wheel driving device for a loader including a belt type transmission unit adapted to selectively drive wheels of the loader in a normal or reverse direction by power transmitted from an engine to a power transmission unit, the belt type transmission unit having forward and rearward belts for driving the wheels in normal and reverse directions, respectively, clutch type levers respectively mounted on the case at opposite sides of the case, the levers being adapted to selectively apply pressure to the forward and rearward belts, thereby operatively connecting the forward and rearward belts to the wheels, respectively, and hydraulic cylinders each adapted to hydraulically switch each lever between a position where it applies the pressure to each corresponding belt and a position where it releases the pressure applied to the corresponding belt.

1 Claim, 6 Drawing Sheets

WHEEL DRIVING DEVICE FOR LOADER

BACKGROUND OF THE INVENTION

1. Field of the Invention

The present invention relates to a wheel driving device for a loader, and more particularly to such a wheel driving device capable of minimizing impacts and vibrations generated upon manipulating a clutch type lever adapted to selectively cut off a drive force generating from an engine and transmitted to the equipment wheels via a gear type transmission, thereby extending the life of a belt used to transmit the drive force.

2. Description of the Prior Art

The present invention is an improvement over a wheel driving device for an agricultural skid loader as disclosed in Korean Utility Model Application No. 92-5717 filed by the applicant. As shown in FIGS. 1 to 5, the wheel driving device disclosed in the above application includes a gear type transmission adapted to receive power from an engine 1 and installed in a case 2 carrying a speed change unit A and a braking unit B. The wheel driving device also includes a belt type transmission 4 for selectively transmitting power from the engine 1 to wheels 3 in a normal or reverse direction, and a clutch 5 for selectively manipulating the belt type transmission 4 to normally or reversely driving the wheels 3.

As shown in FIG. 5, the gear type transmission includes a drive gearing 12 comprised of a plurality of gears 6 to 11 operatively connected to one another to directly receive power from the engine 1, and a driven gearing 13 comprised of a plurality of gears 14 to 18 operatively connected to one another to selectively receive the drive force from the drive gearing 12 via the belt type transmission 4, thereby rotating the wheels 3 in a normal or reverse direction.

The speed change unit A is provided at each drive and driven gearings 12 and 13. As shown in FIG. 3, the speed change unit A includes a rotating plate 21 rotatably disposed in the case 2. From the rotating plate 21, a rod extends upwardly such that its upper end is coupled to a manipulating lever 19 installed on the top surface of the case 2. The rotating plate 21 has a cam groove 20 at its lower surface.

The speed change unit A also includes a sliding member 28 slidably fitted around a rod 22 horizontally disposed in the case 2. The sliding member 28 has a ball 25 resiliently mounted in the sliding member 28 such that it is always radially urged against the rod 22. The ball 25 is seated on a selected one of annular steps 23 provided at the outer surface of the rod 22. The sliding member 28 also has a protrusion 24 received in the cam groove 20. Beneath the sliding member 28, a speed change plate 27 is disposed, which serves to shift a two-stage speed change gear 26 slidably engaged with a spline S formed on a shaft 6A of the drive gearing 12.

As shown in FIG. 4, the braking unit B includes a brake drum 29 fixedly fitted in a pulley P1 mounted on a high speed shaft 14A to which forward and rearward driving members of the belt type transmission 4 are coupled. In the interior of the brake drum 29, a brake pad 31 is disposed, which expands in accordance with the operation of a manipulating lever 30 to come into frictional contact with the inner surface of the brake drum 29, thereby braking the high speed shaft 14A.

The belt type transmission 4 includes a first belt V1 constituting the forward driving member which serves to rotate the wheels 3 clockwise in accordance with the operation of a lever L1 of the clutch 5, and a second belt V2 constituting the rearward driving member which serves to rotate the wheels 3 counterclockwise in accordance with the operation of a lever L2 of the clutch 5.

In the above-mentioned conventional wheel driving device for loaders, the power generated from the engine 1 is transmitted to a drive bevel gear 32 connected to the drive shaft of the engine 1 and then sequentially transmitted to gears 6 to 11 via a driven bevel gear 33 engaged with the drive bevel gear 32. The gears 8 and 11, which are operatively connected to the first and second belts V1 and V2 respectively, rotate opposite each other by virtue of the gears 9 and 10 engaged therebetween.

When the lever L2 of the clutch 5 is manipulated to move the loader rearward, a roller R2 of the lever L2 applies pressure to the second belt V2, as shown in FIGS. 1, 2 and 5. As a result, the second belt V2 comes into contact with an idle pulley P3 mounted at a desired position on the outer surface of the case 2, the pulley P2 mounted on the shaft supporting the gear 8 of the drive gearing 12, and the pulley P1 mounted on the shaft supporting the gear 14 engaged with the drive and driven gearings 12 and 13. Accordingly, the second belt V2 rotates in the same direction as the pulley P2.

As the second belt V2 rotates, the shaft 14A of the gear 14 included in the driven gearing 13, which supports the pulley P1, also rotates in the same direction as the second belt V2. The rotating force of the pulley P1 is sequentially transmitted to the driven gears 14 to 18, thereby causing the wheels 3 to rotate counterclockwise. Thus, the loader moves rearward.

On the contrary, when the lever L1 of the clutch 5 is manipulated to move the loader forward, a roller R1 of the lever L1 applies pressure to the first belt V1. As a result, the first belt V1, which is loose, comes into contact with pulleys P1, P4 and P5, thereby rotating in the same direction as the pulley P4.

At this time, the shaft 11 of the drive gearing 12 supporting the pulley P4 rotates in the opposite direction to the shaft 8, so that all pulleys P1, P4 and P5 rotate clockwise. As a result, the shaft 18 of the driven gearing 13 rotates normally. Thus, the loader moves forward.

On the other hand, where the loader is desired to change its speed, the manipulating lever 19 is manipulated, as shown in FIG. 3. By the operation of the manipulating lever 19, the rotating plate 21, which is disposed in the case 2 beneath the manipulating lever 19, rotates. As the rotating plate 21 rotates, the sliding member 28 slides horizontally along the rod 22 because the protrusion 24 provided at the upper portion of the sliding member 28 is received in the cam groove 20 of the rotating plate 21.

Accordingly, the sliding member 28 can be adjusted in its speed change position as the ball 25 resiliently mounted in the sliding member 28 is selectively seated on one of the steps 23 provided at the outer surface of the rod 22. The movement of the sliding member 28 causes the speed change plate 27 downwardly extending from the sliding member 28 to shift the two-stage speed change gear 26 along the spline S formed on the shaft 6A of the drive gearing 12. As a result, the two-stage speed change gear 26 engages with a selected gear portion of a two-stage gear 26A mounted on a shaft 7 of the drive gearing 12.

When the loader, which is running, is desired to stop, the manipulating lever 30 is manipulated to move pivotally, as shown in FIG. 4. By the pivotal movement of the manipulating lever 30, the brake pad 31, which is disposed in the pulley P1 coupled to the forward and rearward driving members of the belt type transmission 4, expands and comes into contact with the inner surface of the brake drum 29, thereby stopping the rotation of the pulley P1.

In the conventional loader's wheel driving device, the levers L1 and L2 of the clutch 5, which selectively cuts off the power from the engine 1 being transmitted to the wheels of the loader via the gear type transmission installed in the case 2, operate mechanically by means of links. As a result, the first and second belts V1 and V2 are subjected to impact, when they come into contact with the rollers R1 and R2 of levers L1 and L2, due to impact and vibrations generated at hinges of the levers L1 and L2 upon changing the running direction of the loader. Due to such impacts, belts V1 and V2 may become damaged as the operation for changing the running direction of the loader is repeatedly carried out. This results in a shortened life of the belts.

SUMMARY OF THE INVENTION

Therefore, an object of the invention is to provide a wheel driving device for a loader capable of minimizing impacts generated upon manipulating levers adapted to selectively cut off a drive force being generated from an engine and transmitted to the wheels of the loader, thereby preventing the belts, which are selectively coupled to the levers, from being broken.

In accordance with the present invention, this object is accomplished by providing a wheel driving device for a loader comprising a transmission case, a power transmission unit mounted in the case and adapted to receive power from an engine, a belt type transmission unit adapted to selectively drive wheels of the loader in a normal or reverse direction by the power transmitted to the power transmission unit, the belt type transmission unit having forward and rearward belts for driving the wheels in normal and reverse directions, respectively, and clutch type levers respectively mounted on the case at opposite sides of the case, the levers being adapted to selectively apply pressure to the forward and rearward belts, thereby operatively connecting the forward and rearward belts to the wheels, respectively, the wheel driving device further comprising: hydraulic cylinders each adapted to hydraulically switch each lever between a position where it applies pressure to each corresponding belt and a position where it releases the pressure applied to the corresponding belt.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
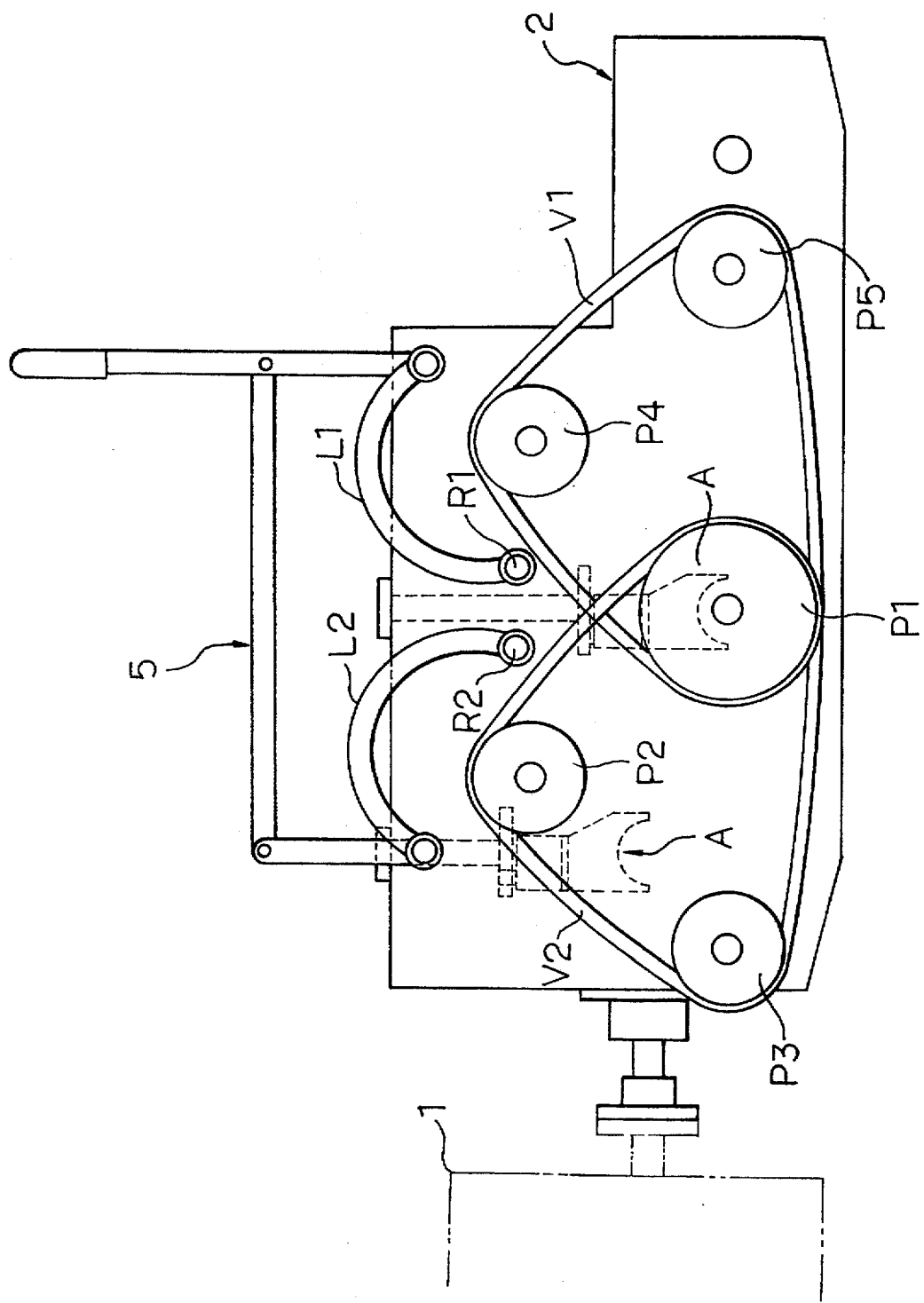
FIG. 1 is a side view illustrating a conventional wheel driving device for loaders.
Figure 2:
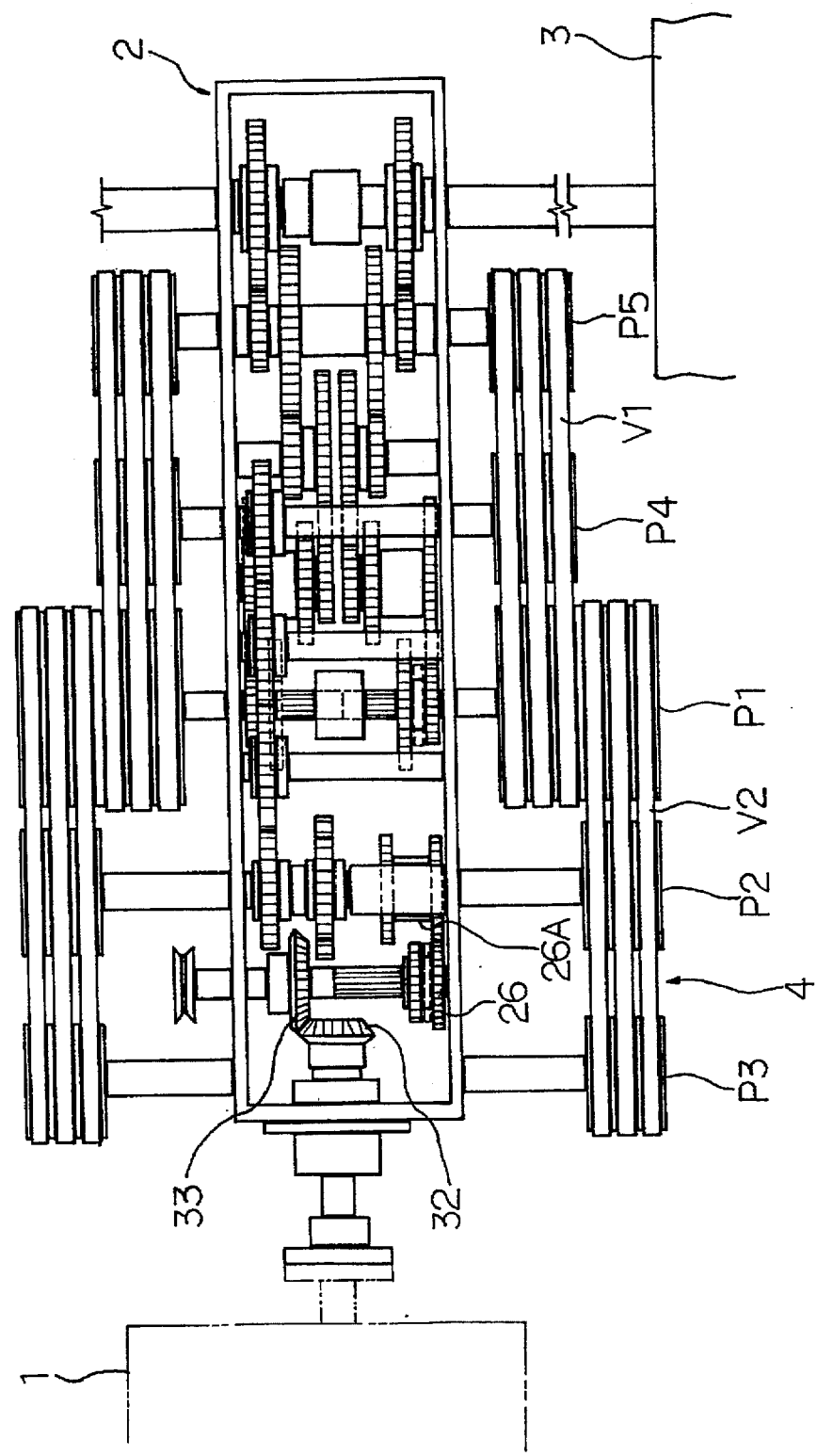
FIG. 2 is a sectional view illustrating the inner construction of the conventional wheel driving device.
Figure 3:
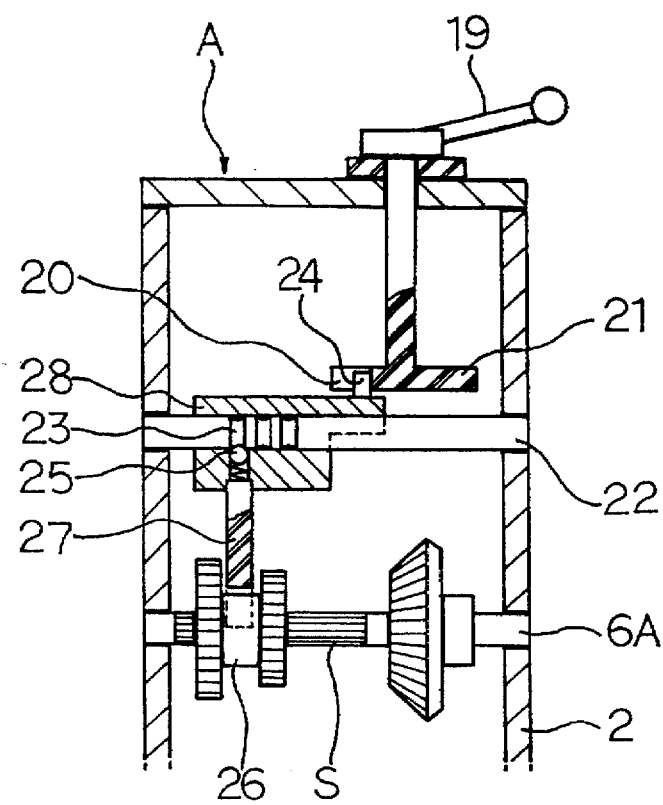
FIG. 3 is a sectional view illustrating a speed change unit included in the conventional wheel driving device.
Figure 4:
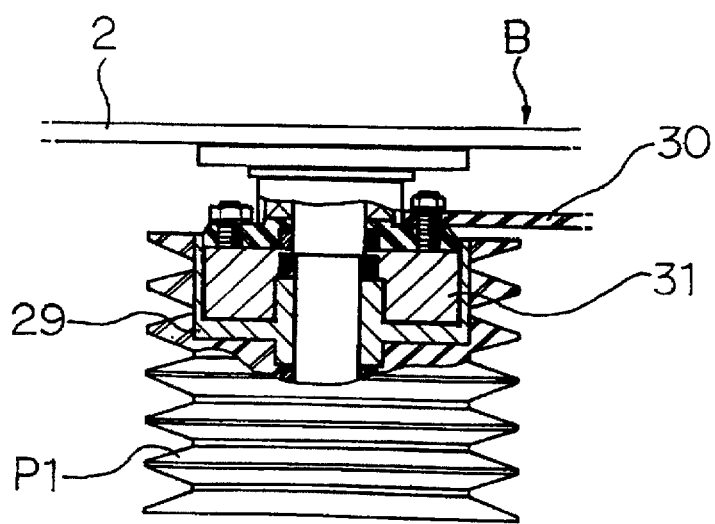
FIG. 4 is a sectional view illustrating a braking unit included in the conventional wheel driving device.
Figure 5:
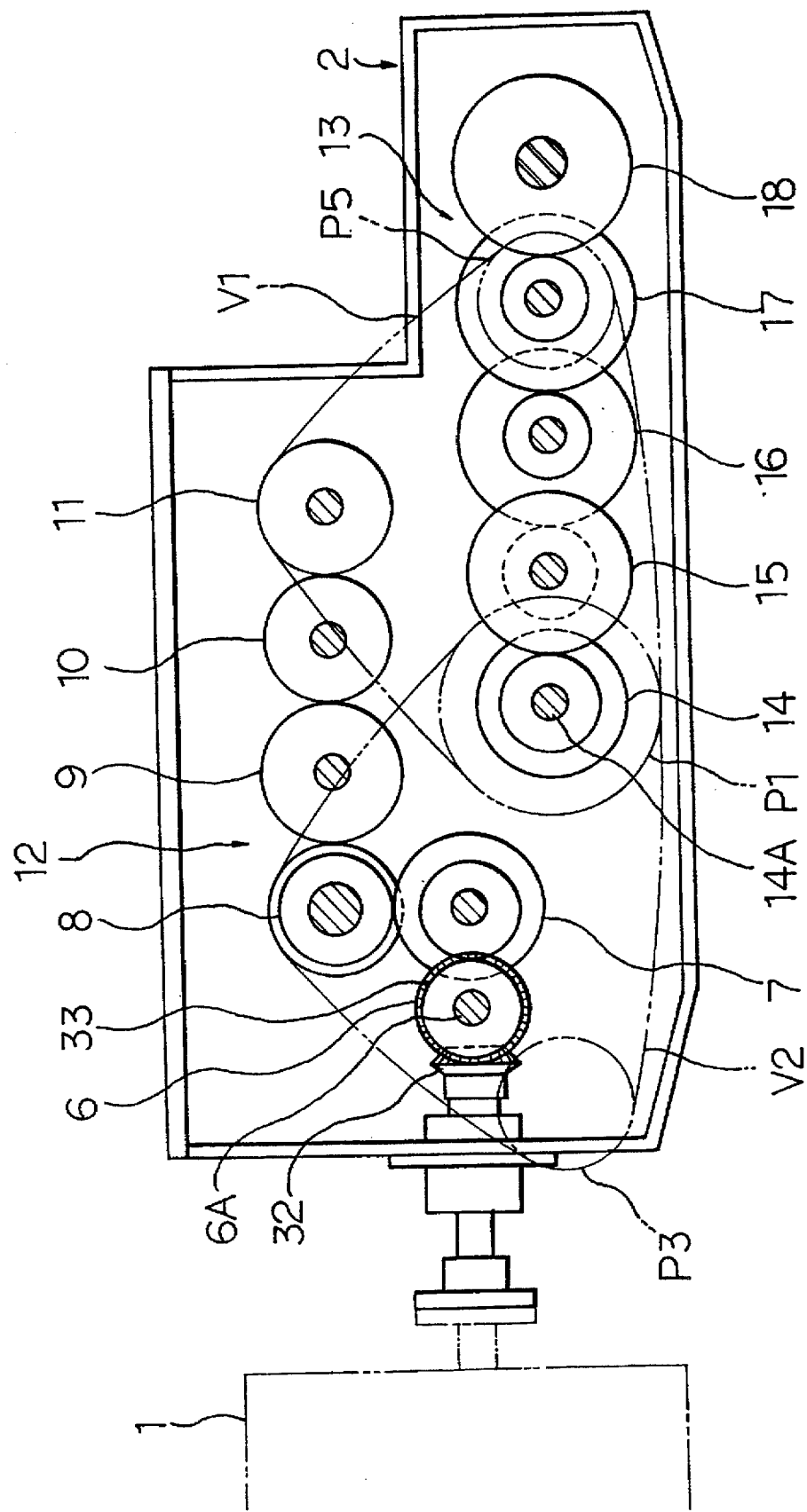
FIG. 5 is a schematic view illustrating a power transmission system used in the conventional wheel driving device.
Figure 6:
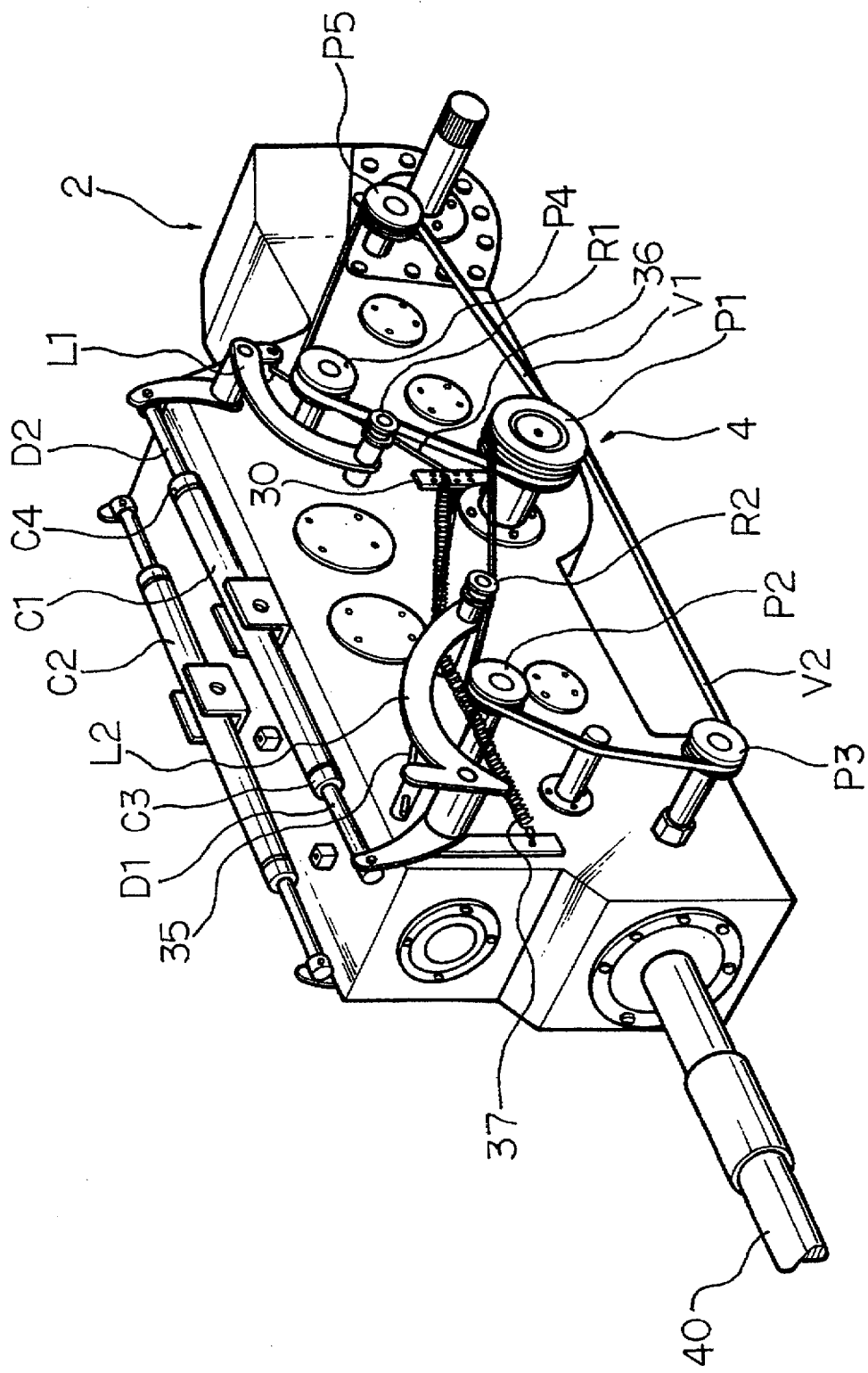
FIG. 6 is a perspective view illustrating a wheel driving device for loaders according to the present invention.
Figure 7:
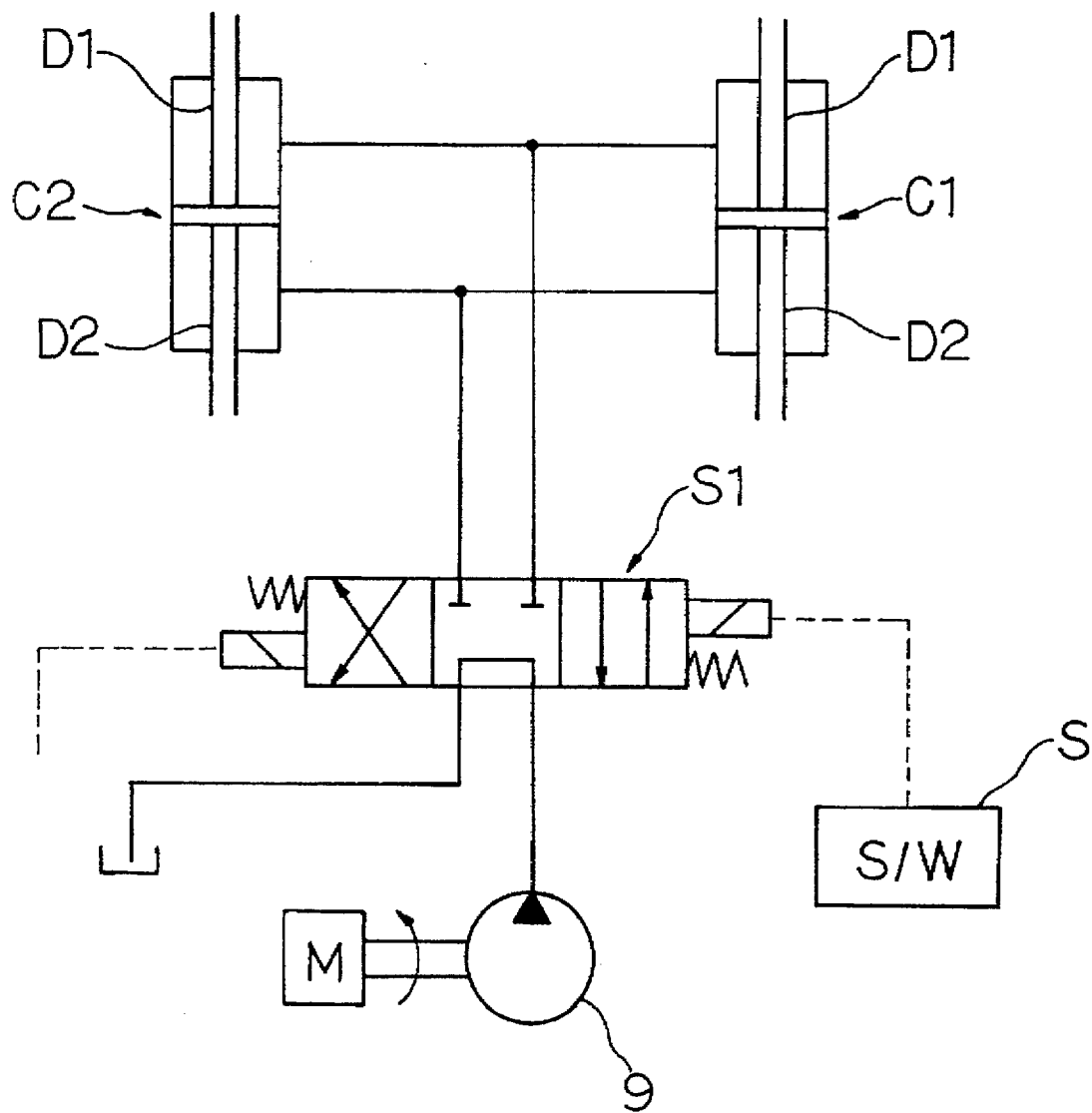
FIG. 7 is a diagram illustrating a hydraulic circuit used in the wheel driving device according to the present invention.

FIGS. 6 and 7 illustrate a wheel driving device for a loader in accordance with the present invention.

As shown in FIG. 6, the wheel driving device according to the present invention includes a power transmission unit including a drive gearing 12 adapted to directly receive the drive force from an engine 1 and a driven gearing 13 adapted to rotate selectively by a belt type transmission 4 comprised of forward and rearward driving members. The wheel driving device also includes a speed change unit A provided at each of the drive and driven gearings 12 and 13 and adapted to change the running speed of the loader between the two stages in a forward or rearward direction by the operation of a lever 19 mounted on the top surface of a case 2. The wheel driving device according to the present invention also includes a braking unit B fixedly fitted in a pulley to which forward and rearward driving members of the belt type transmission 4 are coupled. Since such constructions are the same as those of the conventional wheel driving device, elements thereof respectively corresponding to those of the conventional wheel driving device are denoted by the same reference numerals, and their description will be omitted.

In accordance with the present invention, a pair of hydraulic cylinders C1 and C2 are mounted on the top portion of the case 2 at opposite sides of the case 2, respectively. The hydraulic cylinders C1 and C2 serve to actuate clutch type forward and rearward levers L1 and L2 adapted to selectively apply a pressure to a pair of belts V1 and V2 which constitute the forward and rearward driving members for normally and reversely driving the wheels 3, respectively, by the drive force transmitted to the power transmission unit installed in the case 2. The hydraulic cylinders C1 and C2 are provided with rods D1 and D2, respectively. Either the rod D1 or D2 are pivotally mounted to the forward and rearward levers L1 and L2 at both ends thereof, respectively.

Either the hydraulic cylinder C1 or C2 is actuated by an actuating oil supplied by a hydraulic pump P driven by a motor M under the control of a solenoid valve S1 which is activated by an electrical signal applied thereto via a switch S to control the flow of the actuating oil.

In FIGS. 6 and 7, the reference numerals 35 and 36 denote rods for braking the wheels when the hydraulic cylinders C1 and C2 are in their actuated state. The rods 35 and 36 are pivotally coupled at one-side ends thereof to the levers L1 and L2, respectively. Either the rod 35 or 36 is fixedly mounted to a manipulating lever 30 for actuating the braking unit B fixedly fitted in a pulley P1 to which the forward and rearward driving members of the belt type transmission 4 are coupled. The reference numeral 37 denotes a tension spring for returning the manipulating lever 30 to its original state.

The operation of the wheel driving device according to the present invention will now be described. The power generated from the engine 1 is transmitted to the power transmission unit installed in the case 2 via an input shaft 40. The power transmitted to the power transmission unit is then transmitted to gears 6 to 11 operatively connected to one another by the shaft 6A of the drive gearing 12 in a sequential manner. Accordingly, pulleys P2 and P4 rotate, which are mounted on shafts supporting drive gears 8 and 11 at the outside of the case 2 respectively. In this case, the pulleys P2 and P4 rotate in opposite directions to each other.

When the solenoid valve S1 is switched to its left position, when viewed in FIG. 7, in accordance with an electrical signal applied from the switch S manipulated by the operator, the actuating oil delivered from the hydraulic pump 9 is supplied to the first chamber C3 of the hydraulic cylinder C1 via the solenoid valve S1. As a result, the rod D1 of the hydraulic cylinder C1 is retracted, thereby causing the rearward lever L2 to pivot clockwise. By the clockwise pivotal movement of the rearward lever L2, the roller R2 mounted to the rearward lever L2 applies a certain pressure to the second belt V2 wrapped in a loose state around the idle pulley P3, the pulley P2 mounted on the shaft supporting the drive gear 8 and the pulley P1 to which both the first and second belts V1 and V2 are coupled. Accordingly, the second belt V2 has a certain tension.

At this time, the manipulating lever 30 mounted outwardly of the pulley P1 is in a clockwise pivoted state. In other words, the braking unit B disposed in the pulley P1 is at a position where it releases its braking force. On the other hand, the forward lever L1 is in a state that it is spaced away from the first belt V1 as it pivots clockwise by the extension of the rod D2 of the hydraulic cylinder C1.

In this state, the drive gear 8 rotates counterclockwise. Accordingly, the second belt V2 rotates in the same direction as the drive gear 8. As a result, the driven gear 14 coupled to the pulley P1 rotates in the same direction as the second belt V2. Thus, the drive force from the engine 1 is transmitted to the driven gears 14 to 18 in a sequential manner, thereby causing the wheels 3 to rotate rearward.

Meanwhile, when the supply of the actuating oil to the hydraulic cylinder C1 is cut off, the manipulating lever 30 is returned to its original state by the resilience of the tension spring 37, thereby causing the pulley P1 to stop rotating. As the rod 35, which is coupled at both ends thereof respectively to the rearward lever L2 and manipulating lever 30, is returned to its original state, the rearward lever L2 is spaced away from the second belt V2.

Where the loader is desired to move forward, the actuating oil delivered from the hydraulic pump P is supplied to the second chamber C4 of the hydraulic cylinder C1 via the solenoid valve S1 in accordance with a switching operation of the switch S manipulated by the operator. As a result, the rod D2 of the hydraulic cylinder C1 is retracted, thereby causing the forward lever L1 to pivot counterclockwise. By the counterclockwise pivotal movement of the forward lever L1, the roller R1 mounted to the forward lever L1 applies a certain pressure to the first belt V1 wrapped in a loose state around the pulley P4 mounted on the shaft supporting the drive gear 11, the pulley P5 mounted on the shaft supporting the driven gear 17 and the pulley P1 to which both the first and second belts V1 and V2 are coupled. Accordingly, the first belt V1 has a certain tension.

At this time, the braking unit B disposed in the pulley P1 is at a position where it releases its braking force by a pivotal movement of the manipulating lever 30. On the other hand, the rearward lever L2 is in a state that it is spaced away from the second belt V2.

In this state, the pulley P4 mounted to the shaft supporting the driving gear 11 rotates in the opposite direction to the pulley P2 operatively coupled to the drive gear 8. Accordingly, the first belt V1 rotates clockwise, thereby causing the driven gears 14 to 18 to rotate sequentially. Thus, the wheels 3 rotate forward.

As apparent from the above description, the present invention provides a wheel driving device for a loader, which includes a hydraulic cylinder for driving forward and rearward levers adapted to selectively supply or cut off power from the engine, thereby normally or reversely driving the wheels of the loader. With such a construction, the wheel driving device enables the levers to be easily manipulated. Moreover, it is possible to minimize impacts generated when the levers come into contact with associated belts, thereby preventing the belts from being early worn or broken.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A wheel driving device for a loader comprising a transmission case, a power transmission unit mounted in the case and adapted to receive power from an engine, a belt type transmission unit adapted to selectively drive wheels of the loader in a normal or reverse direction by the power transmitted to the power transmission unit, the belt type transmission unit having forward and rearward belts for driving the wheels in normal and reverse directions, respectively, and clutch type levers respectively mounted on the case at opposite sides of the case, the levers being adapted to selectively apply pressure to the forward and rearward belts, thereby operatively connecting the forward and rearward belts to the wheels, respectively, the wheel driving device further comprising:

hydraulic cylinders each adapted to hydraulically switch each lever between a position where it applies the pressure to each corresponding belt and a position where it releases the pressure applied to the corresponding belt.

* * * * *